United States Patent
Katusic et al.

(10) Patent No.: US 7,374,743 B2
(45) Date of Patent: May 20, 2008

(54) NANOSCALE INDIUM TIN MIXED OXIDE POWDER

(75) Inventors: Stipan Katusic, Kelkheim (DE); Guenther Michael, Karlstein (DE); Peter Kress, Karlstein (DE); Andreas Gutsch, Ranstadt (DE); Friedrich Georg Schmidt, Haltern (DE); Thomas Hasskerl, Kronberg (DE)

(73) Assignee: Degussa AG, Duesseldorf (DE)

( * ) Notice: Subject to any disclaimer, the term of this patent is extended or adjusted under 35 U.S.C. 154(b) by 246 days.

(21) Appl. No.: 10/546,145

(22) PCT Filed: Mar. 5, 2004

(86) PCT No.: PCT/EP2004/002283

§ 371 (c)(1),
(2), (4) Date: Aug. 22, 2005

(87) PCT Pub. No.: WO2004/080144

PCT Pub. Date: Sep. 23, 2004

(65) Prior Publication Data

US 2007/0003779 A1    Jan. 4, 2007

(30) Foreign Application Priority Data

Mar. 14, 2003    (DE)    ............... 103 11 645

(51) Int. Cl.
C01G 15/00    (2006.01)
C01G 19/02    (2006.01)

(52) U.S. Cl. .................... 423/618; 423/624

(58) Field of Classification Search ........... 423/89, 423/111, 137, 618, 624
See application file for complete search history.

(56) References Cited

U.S. PATENT DOCUMENTS 6,821,559 B2 * 11/2004 Eberspacher et al. ....... 427/226

(Continued)

FOREIGN PATENT DOCUMENTS

EP    0 604 969    7/1994

(Continued)

OTHER PUBLICATIONS

U.S. Appl. No. 11/574,020, filed Feb. 21, 2007, Katusic et al.

(Continued)

*Primary Examiner*—H. T Le
(74) *Attorney, Agent, or Firm*—Oblon, Spivak, McClelland, Maier & Neustadt, P.C.

(57) ABSTRACT

Mixed oxide powder containing indium and tin, with a proportion of indium oxide of between 90 and 98 wt. % and a BET surface area of 40 to 120 $m^2/g$, which is in the form of aggregates having an average circumference of less than 500 nm, consists of at least 95% of an indium oxide phase and displays an oxygen content that is lower than the content that theoretically results from In2O3 and SnO2. It is produced by mixing a solution of an indium compound with a solution of a tin compound, atomising this mixture of solutions, pyrolysing the atomised mixture of solutions in a first zone of a reactor and in a second zone of the reactor, following pyrolysis, adding reducing gases to the pyrolysed mixture at one or more points in a quantity such that overall a reducing atmosphere is established in this second zone, and separating the resulting solid from the waste gases in a further, third zone, in which a reducing atmosphere likewise still prevails. It can be used for the production of transparent, electroconductive paints and coatings.

6 Claims, 3 Drawing Sheets

TEM image of the mixed oxide powder from example 1

U.S. PATENT DOCUMENTS

| | | | |
|---|---|---|---|
| 6,908,574 B2* | 6/2005 | Inamura et al. | 252/518.1 |
| 7,172,817 B2* | 2/2007 | Kishimoto et al. | 428/545 |
| 2001/0036437 A1* | 11/2001 | Gutsch et al. | 423/610 |
| 2002/0006470 A1* | 1/2002 | Eberspacher et al. | 427/216 |
| 2003/0124051 A1* | 7/2003 | Servaty et al. | 423/593 |
| 2006/0193764 A1 | 8/2006 | Katusic et al. | |
| 2007/0003779 A1 | 1/2007 | Katusic et al. | |

FOREIGN PATENT DOCUMENTS

| | | |
|---|---|---|
| JP | 2001-220137 | 8/2001 |
| JP | 2002-029144 | 1/2002 |

OTHER PUBLICATIONS

U.S. Appl. No. 11/509,741, filed Aug. 25, 2006, Hill et al.

* cited by examiner

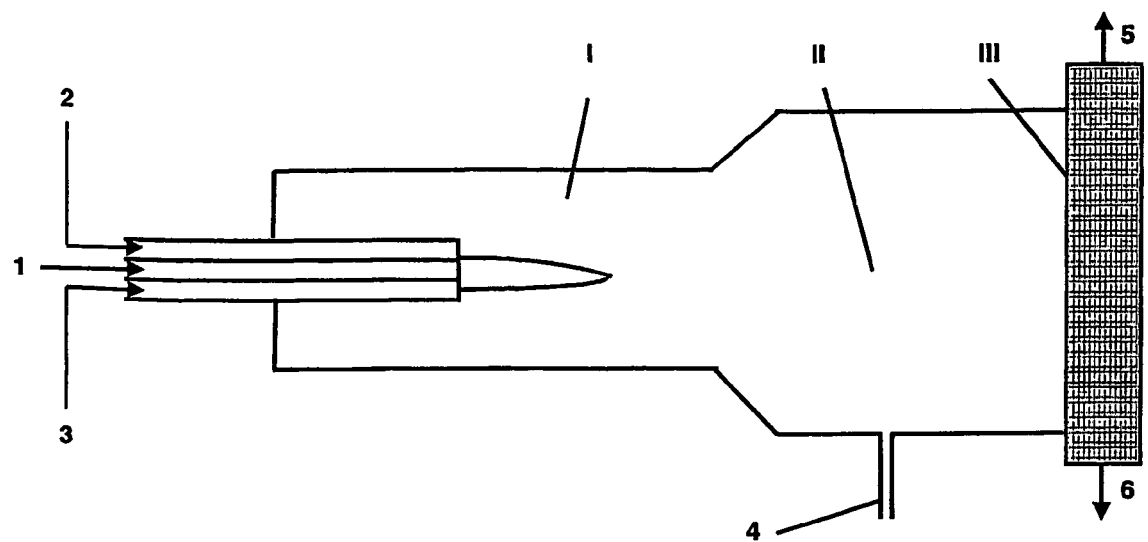
Figure 1: Schematic view of the process according to the invention

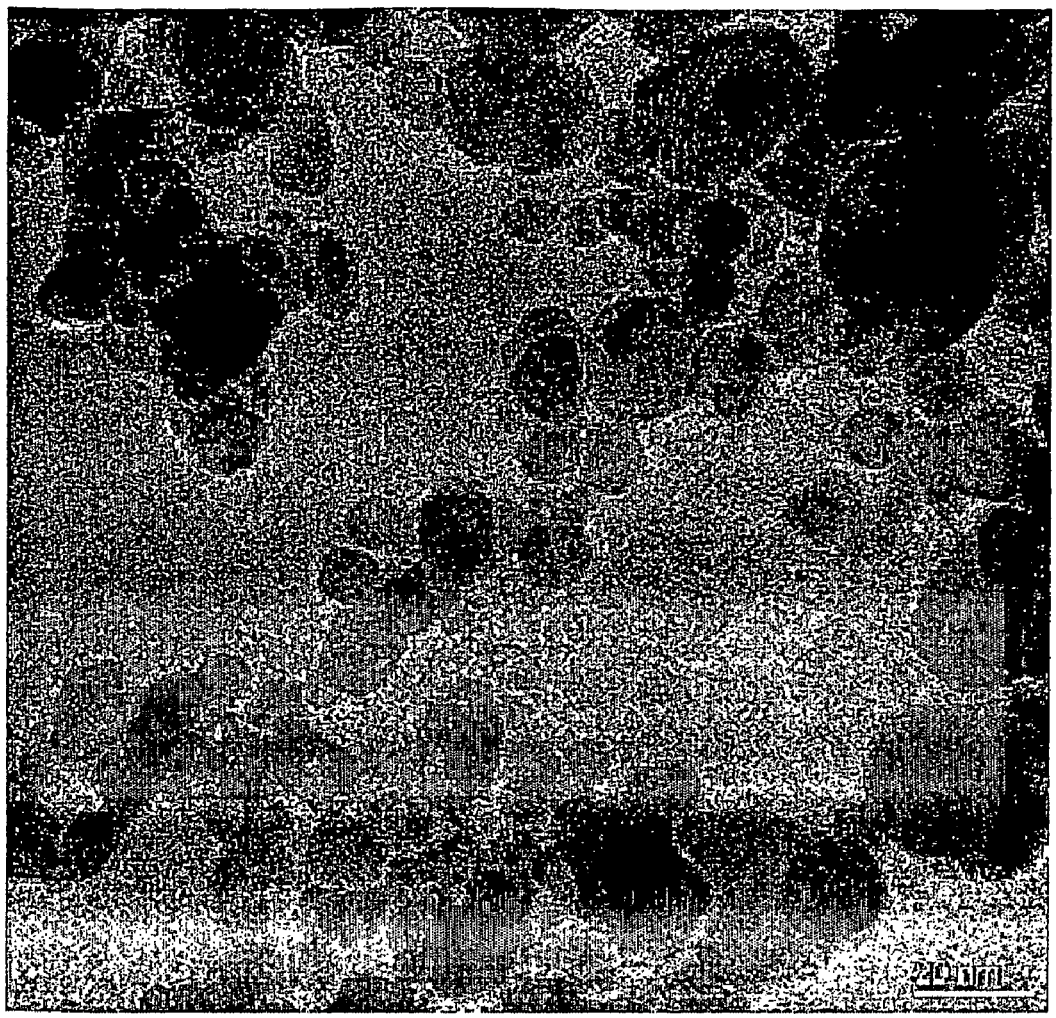
Figure 2: TEM image of the mixed oxide powder from example 1

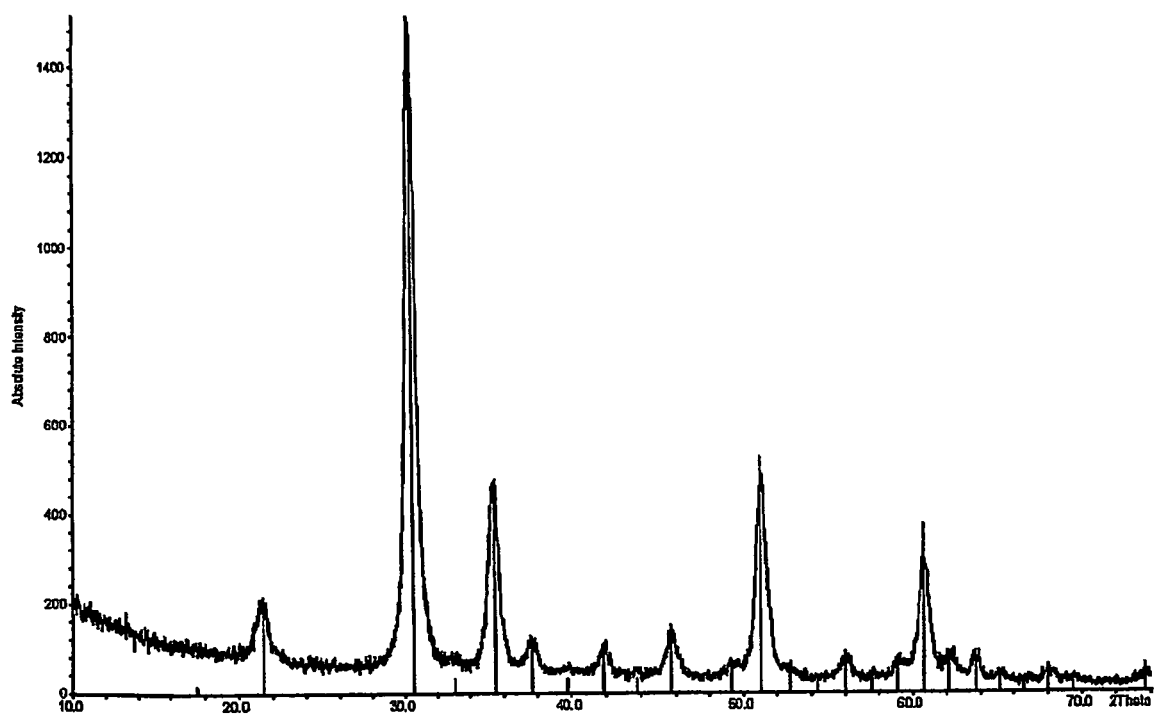
Figure 3a: X-ray diffraction diagram of the mixed oxide powder from example 1
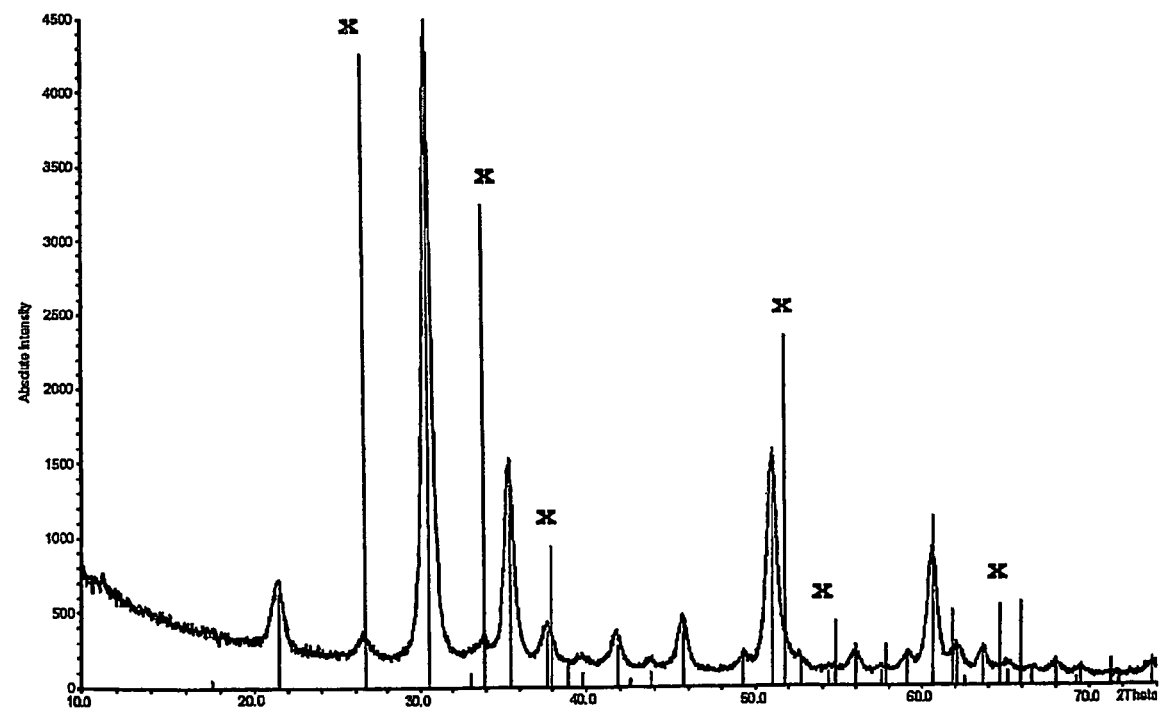
Figure 3b: X-ray diffraction diagram of the mixed oxide powder from example 8 (comparative example)

NANOSCALE INDIUM TIN MIXED OXIDE POWDER

The invention provides an indium tin oxide powder, its production and use.

Indium tin oxide powders are generally obtained from aqueous solutions by reacting water-soluble salts of indium and tin in the presence of alkaline substances. This initially produces hydroxides, which can be calcined in a subsequent step. DE-A-100 22 037 for example describes the calcining of these hydroxides under reducing conditions at temperatures of between 200 and 400° C., preferably 250° C., and for residence times of between 15 and 120 minutes, preferably 60 minutes. In an embodiment example from DE-A-100 22 037 an indium tin oxide powder produced in this way has a dark brown colour.

This powder can be suitable for the production of IR-absorbing compositions. The resistance is too high for use in electroconductive paints and coatings, however. Furthermore, for many areas of application of indium tin oxide powders a brown coloration is undesirable.

EP-A-1 142 830 describes the production of nanoscale oxides by pyrolysis of organometallic precursors. The reaction of indium and tin precursors under these conditions is also claimed.

However, the document makes no mention of how an electroconductive indium tin oxide can be obtained. Tests have shown that indium tin oxides with good electrical conductivity cannot be obtained by the method described in EP-A-1 142 830.

EP-A-1 270 511 describes indium tin mixed oxide powders and doped indium tin mixed oxide powders, which are obtained by pyrolysis of an indium and a tin salt. The X-ray structural analysis of the powders produced in this way shows cubic indium oxide and tetragonal tin oxide. The conductivity of these powders is too low for many applications in the area of electroconductive paints and coatings.

BRIEF DESCRIPTION OF THE DRAWINGS

FIG. 1 shows a schematic structure of the process according to the invention.

FIG. 2 shows a TEM image of the mixed oxide powder with its aggregated structure according to the invention.

FIGS. 3a and 3b show a XRD images of the powder according to the invention.

The object of the invention is to provide indium tin mixed oxide powders having an elevated electrical conductivity in comparison to the prior art. In applications the powders should also display a high transparency and lead to no yellowish or brownish coloration.

The object is achieved by a mixed oxide powder containing indium and tin, which is characterised in that it
- displays a proportion of indium, calculated as $In_2O_3$, of between 90 and 98 wt. %, preferably between 90 and 95 wt. %,
- displays a BET surface area of 40 to 120 $m^2/g$,
- is in the form of aggregates having an average circumference of less than 500 nm,
- shows only one phase of cubic indium oxide in the X-ray diffraction analysis,
- displays an oxygen content that is lower than the content that theoretically results from $In_2O_3$ and $SnO_2$.

In the mixed oxide powder according to the invention the proportion of indium, calculated as $In_2O_3$, is between 90 and 98 wt. %. At values below 90 wt. % or over 98 wt. % a reduced electrical conductivity is obtained. In a preferred embodiment the content of indium is between 92 and 95 wt. % and in a particularly preferred embodiment between 93 and 94 wt. %.

The BET surface area is determined according to DIN 66131. In the mixed oxide powder according to the invention it is between 40 and 120 $m^2/g$. For technical reasons surface areas greater than 120 $m^2/g$ are difficult to produce. Mixed oxide powders having specific surface areas of less than 40 $m^2/g$ lead to low transmission and/or to undesirable yellowish or brownish discolorations in applications. In a particular embodiment the mixed oxide powder can display a BET surface area of between 60 and 100 $m^2/g$, values between 70 and 90 $m^2/g$ being particularly preferable with regard to the achievable electrical conductivity.

The mixed oxide powder according to the invention is in the form of aggregates of primary particles. In order to obtain as high a transparency as possible the aggregates display an average circumference of less than 500 nm. The aggregate size can preferably display values of less than 300 nm.

The X-ray diffraction analysis of the powder according to the invention shows only a single phase, namely that of cubic indium oxide. A tin oxide phase cannot be detected.

The oxygen content of the mixed oxide powder according to the invention is lower than the content that theoretically results from $In_2O_3$ and $SnO_2$. On the basis of a mixed oxide powder composed of 95 wt. % $In_2O_3$ and 5 wt. % SnO2, for example, the theoretical oxygen content is 17.40 wt. %. Within the specified limits for the proportion of indium, calculated as $In_2O_3$, of 90 to 98 wt. %, the theoretical oxygen content is between 17.51 wt. % and 17.33 wt. %.

Now the powder according to the invention displays an oxygen content that is below the theoretical value. The mixed oxide powders according to the invention therefore demonstrate a particularly good transparency in applications and a colour that is dependent on the oxygen content.

In a preferred embodiment the oxygen content can be 0.5 to 1 wt. % below the theoretical value.

The mixed oxide powder according to the invention can be doped with up to 3 wt. %, particularly preferably 0.01 to 1 wt. %, relative to $In_2O_3$, of at least one doping substance in the form of a metal and/or an oxide.

Suitable doping substances are the oxides and/or the elemental metals from the group comprising aluminium, antimony, cadmium, calcium, cerium, iron, gold, iridium, potassium, cobalt, copper, magnesium, sodium, nickel, manganese, palladium, platinum, osmium, rhodium, ruthenium, tantalum, titanium, silver, silicon, vanadium, yttrium, tungsten, zinc and zirconium. A doping with potassium, platinum or gold can be particularly preferred.

In a preferred embodiment of the invention the mixed oxide powder displays CIE-L*a*b* values of L=+40 to +55; a=−6.2 to −8.5; b=−1 to −12. CIE-L*a*b* describes a colour space in which colours are uniquely described by three coordinates.

In a further embodiment the mixed oxide powder according to the invention can display a specific resistance of less than 400 Ohm.cm at a compressed density of 0.6 g·$cm^3$. Values between 100 and 150 Ohm·cm at a compressed density of 0.6 g·$cm^{-3}$ can be particularly preferred.

The invention also provides a process for the production of the mixed oxide powder according to the invention, which is characterised in that
- a solution of an indium compound is mixed with a solution of a tin compound, a solution of a compound of at least one doping component optionally added, this mixture of solutions is atomised, the atomised mixture of solutions is pyrolysed in a first zone of a reactor and in a second zone of the reactor, following pyrolysis, reducing gases are added to the pyrolysed mixture at one or more points in a quantity such that overall a reducing atmosphere is established in this second zone, and the solid obtained is separated from the waste gases in a further, third zone, in which a reducing atmosphere likewise still prevails.

A solution within the meaning of the invention is understood to be one in which the liquid phase is an aqueous, aqueous/organic or organic solution. Alcohols- such as methanol, ethanol, n-propanol, iso-propanol, n-butanol or iso-butanol or tert.-butanol can be used as preferred organic solvents. The process according to the invention allows the use of the three cited variants. In this way a large number of indium and tin compounds, and optionally doping substances, can be used.

Suitable indium and tin compounds can be organometallic compounds with alkyl radicals, such as for example methyl, ethyl, n-propyl, iso-propyl, n-butyl, iso-butyl or tert.-butyl, or the corresponding alkoxy variants.

Salts of indium or tin, optionally also those of a doping substance, can also be used in the form of the halides or nitrates.

The use of indium chloride and tin chloride is particularly economical.

A doping substance within the meaning of the invention is the substance used for doping, for example a salt. The doping component is the metal or metal oxide in the mixed oxide powder derived from the doping substance by use of the process according to the invention.

The solution can be atomised both by ultrasonic nebulisation and by using a two-fluid nozzle.

Pyrolysis within the meaning of the invention is understood to be the conversion of the indium and tin compounds and. optionally the doping substances into mixed oxides. Pyrolysis takes place in a flame containing an oxygen-containing gas, usually air, and a fuel gas. Fuel gases can be e.g. hydrogen, methane, ethane, propane, butane, natural gas.

The residence time in the first zone can preferably be between 0.8 and 1.5 seconds and particularly preferably between 1 and 1.2 seconds.

In addition to the mixed oxides, the pyrolysed mixture also includes the gaseous reaction products and unreacted gaseous feed materials. Gaseous reaction products can be carbon dioxide or hydrogen chloride, for example.

According to the invention the pyrolysed mixture is mixed with a reducing gas. This can be for example forming gas, hydrogen, carbon monoxide, ammonia or mixtures of the cited gases, forming gas being particularly preferable. In the process according to the invention such a reducing gas is added to the pyrolysed mixture in a quantity such that a reducing atmosphere is established.

A reducing atmosphere within the meaning of the invention is understood to be one in which the lambda value is less than 1.

If hydrogen, air and forming gas (80:20 $N_2/H_2$) are used, the lambda value in reducing zones II and III for example is determined according to the following formula:

$$0.21 \cdot (\text{air} + \text{atomising air})/0.5 \cdot (\text{hydrogen} + 0.2 \cdot \text{forming gas}),$$

relative in each case to the amount of gas fed in per unit time.

For zone I, in which the pyrolysis takes place, the lambda value is greater than 1. If hydrogen and air are used, the lambda value in zone I is determined according to the following formula:

$$0.21 \cdot (\text{air} + \text{atomising air})/0.5 \cdot \text{hydrogen}$$

In a preferred embodiment the sum of the residence times in the second and third zone can be between 15 seconds and 15 minutes.

By changing the residence times in the three zones the physical-chemical properties of the powders according to the invention can be influenced. For example, extending the residence time in the second and/or third zone can determine the colour of the powder. Changing the residence time in the first zone can influence the BET surface area, for example.

FIG. 1 shows a schematic structure for performing the process according to the invention. I, II and III indicate the three reaction zones. In addition, 1=atomised solution of indium and tin compound, optionally additional doping substance or doping substances; 2 =oxygen-containing gas, preferably air; 3=fuel gas, preferably hydrogen; 4=reducing gas; 5=waste gas; 6=powder according to the invention.

The invention also provides the use of the mixed oxide powder according to the invention for the production of transparent, electroconductive paints and coatings, of solar cells and UV absorbers, and in medical engineering.

EXAMPLES

The BET surface area is determined according to DIN 66131.

The average aggregate circumference is determined by the evaluation of TEM images. The TEM images are obtained with a Hitachi TEM device, model H-75000-2, and evaluated using a CCD camera on the TEM device followed by image analysis.

The specific electrical resistance of the powders is measured at room temperature and 40% relative humidity as a function of the compressed density. To that end the sample is placed between two movable electrodes and the current flow calculated after application of a direct current. The density of the powder is then gradually increased by reducing the distance between the electrodes and the resistance measured again. The measurement is performed in accordance with DIN IEC 93. The minimum specific resistance is obtained at a substance-dependent maximum compressed density.

The oxygen content of the powders is determined using an NOA5003 Element Determinator supplied by Rose Mount.

The L*a*b* values are measured using a Microcolor 2 device, model no. NMG 141, from Dr. Bruno Lange.

Example 1

An aqueous solution containing 88.9 g/l indium(III) chloride and 8.4 g/l tin(IV) chloride is atomised into a reaction tube at a delivery rate of 1500 ml/h using compressed air and a nozzle (diameter 0.8 mm). An oxyhydrogen flame comprising 5 $m^3$/h hydrogen and 15 $m^3$/h air is burning there. The temperature 0.5 m below the flame is 750° C. 2.5 m below the flame 10 $m^3$/h forming gas are fed in; the temperature above the admission point is approximately 450° C. The reaction mixture passes through a residence time section measuring 2 m in length in 14 seconds. The solid is then separated from the gaseous substances by means of a filter and treated with a continuous supply of forming gas for a period of 15 minutes at a temperature of 250° C.

Examples 2 to 6 are performed according to example 1. Examples 4 to 6 additionally contain a doping component, which is supplied to the pyrolysis stage in the aqueous solution containing indium(III) chloride and tin(IV) chloride. The amounts used are reproduced in Table 1.

Examples 7 to 9 are comparative examples. Examples 7 and 8 are performed in the same way as example 1, but without the supply of forming gas. The amounts used are reproduced in Table 1.

Example 9

140 g indium (III) chloride (0.63 mol, anhydrous), 18 g tin(IV) chloride·5 $H_2O$ are introduced into 1400 ml water and stirred. After a clear solution is formed it is heated to 50° C. and 105 ml ammonium hydroxide solution (25%) added dropwise with vigorous stirring. The suspension is stirred for a further 24 hours at 50° C. A further 280 ml ammonium hydroxide solution are then added to the mixture to complete the precipitation. A white deposit is formed, which is removed by centrifugation. The powder is then dried in vacuo at 190° C. until a pale yellow coloration of the powder could be detected. The dried powder is then finely ground in a mortar at 250° C. and held under a forming gas atmosphere for 60 minutes.

The physical-chemical data for the powders from examples 1 to 9 is reproduced in Table 2.

The powders according to the invention from examples 1 to 6 show only the signal from cubic indium oxide in the X-ray diffraction diagram, an aggregate structure in the TEM images, display a BET surface area of between 45 and 80 $m^2/g$ and an oxygen content of between 16 and 17%.

The influence of the processing conditions becomes especially clear in the powder according to the invention from example 1 and the powder from comparative example 7. Whilst for example the composition, the BET surface area and the X-ray diffraction analysis deliver the same values, the powder according to the invention displays a different colour, blue instead of yellow in example 7, and a substantially lower electrical resistance.

In the X-ray diffraction analysis the powder from example 9 obtained by precipitation shows the signals from cubic indium oxide and tetragonal zinc oxide. The specific resistance at a compacted density of 0.6 $g/cm^3$ is substantially higher than in the powders according to the invention from examples 1 to 6.

FIG. 2 shows a TEM image of the mixed oxide powder with its aggregated structure from example 1.

FIG. 3a shows an XRD image of the powder according to the invention from example 1, FIG. 3b an XRD image of the powder from example 8 (comparative example). In FIG. 3a the signals from indium oxide are also shown for comparison, in FIG. 3b those from indium oxide and tin oxide. The most intensive tin oxide signals are indicated by x.

TABLE 1

Amounts used and settings in examples 1 to 7

| | | Example | | | | | | | |
|---|---|---|---|---|---|---|---|---|---|
| | | 1 | 2 | 3 | 4 | 5 | 6 | 7 | 8 |
| In/Sn/doping substance[a] | | 94/6/— | 93/7/— | 92/8/— | 93/6/1[c] | 94/5/1[d] | 94.5/5/0.5[e] | 94/6/— | 88/12/— |
| Throughput | g/h | 1500 | 1600 | 1400 | 1550 | 1500 | 1500 | 1550 | 1500 |
| Conc. in $H_2O$ | wt. % | 5 | 4.5 | 5 | 5 | 5 | 5 | 5.5 | 6 |
| Hydrogen | $m^3/h$ | 5 | 5 | 5 | 5 | 5 | 5 | 4.5 | 4.5 |
| Air | $m^3/h$ | 9 | 8.8 | 10 | 10 | 10 | 9 | 8 | 8 |
| Atomising air | $m^3/h$ | 4 | 4 | 5 | 5 | 5 | 4 | 4 | 4 |
| Forming gas[b] | $m^3/h$ | 10 | 10 | 10 | 10 | 10 | 10 | 0 | 0 |
| Lambda zone I | | 1.09 | 1.05 | 1.26 | 1.26 | 1.26 | 1.12 | 1.09 | 1.12 |
| Lambda zone (II + III) | | 0.78 | 0.75 | 0.90 | 0.90 | 0.90 | 0.78 | 1.09 | 1.12 |

[a] all chlorides;
[b] 80:20 $N_2/H_2$; doping substances:
[c] KCl;
[d] $H_2PtCl_6$;
[e] $HAuCl_4$

TABLE 2

Physical-chemical data for the powders from examples 1 to 9

| | | Example | | | | | | | | |
|---|---|---|---|---|---|---|---|---|---|---|
| | | 1 | 2 | 3 | 4 | 5 | 6 | 7 | 8 | 9 |
| Proportion of $In_2O_3/SnO_2$ | % | 94/6 | 93/7 | 92/8 | 93/6 | 93/5 | 94.5/5 | 94/6 | | 94/6 |
| BET surface area | $m^2/g$ | 53 | 80 | 64 | 48 | 45 | 64 | 53 | 62 | 60 |
| Average aggregate diameter | nm | 294 | 190 | — | 264 | — | — | 333 | — | — |
| XRD phase for $In_2O_3$ | | cubic | cubic | cubic | cubic | cubic | cubic | cubic | cubic | cubic |

TABLE 2-continued

Physical-chemical data for the powders from examples 1 to 9

| | | Example 1 | 2 | 3 | 4 | 5 | 6 | 7 | 8 | 9 |
|---|---|---|---|---|---|---|---|---|---|---|
| XRD phase for $SnO_2$ | | — | — | — | — | — | — | — | tetrag. | orthog. |
| Theoretical oxygen found | % | 17.41 | 17.44 | 17.47 | 17.44 | 17.44 | 17.42 | 17.41 | | 17.42 |
| | | 16.8 | 16.5 | 17.0 | 16.5 | 16.2 | 17.0 | 17.5 | | — |
| Spec. resistance at 0.6 g/cm³ | Ohm * cm | 111 | 398 | 1710 | 326 | 362 | 133 | 19266 | 14200 | 783000 |
| Minimum specific resistance | Ohm * cm | 4 | 28 | 118 | 326 | 127 | 8 | 758 | 14200 | 35 |
| Visual colour impression | | blue | blue | blue | blue | black-green | violet | yellow | yellow | blue |
| L*a*b* colour | L* | 51.27 | 51.05 | 53.71 | 52.43 | 40.67 | 52.45 | 82.94 | 85.05 | 50.01 |
| | a* | −8.03 | −7.62 | −6.49 | −8.06 | 5.37 | 8.06 | −3.66 | −1.76 | −7.99 |
| | b* | −7.46 | −3.23 | −8.21 | −3.74 | 0.16 | 0.2 | 23.88 | 22.31 | −7.51 |

The invention claimed is:

1. A process for the production of a mixed indium tin oxide powder comprising:
   mixing a solution of an indium compound with a solution of a tin compound,
   and optionally adding a solution of a compound of at least one doping component,
   atomizing the mixture of solutions,
   pyrolysing the atomised mixture of solutions in a first zone of a reactor,
   adding reducing gases to the pyrolysed mixture in a second zone of the reactor, following pyrolysis,
   separating the obtained solid from waste gases in a third zone,
   wherein
   the reducing gases are added at one or more points in the second zone in a sufficient quantity to establish a reducing atmosphere in the second zone and in the third zone.

2. The process according to claim 1, wherein the solutions of an indium compound, a tin compound and a compound of at least one doping component are aqueous, aqueous/organic or organic.

3. The process according to claim 1, wherein the indium and tin compounds, and the compound of at least one doping component, are organometallic compounds or salts.

4. The process according to claim 1, wherein the reducing gases are at least one selected from the group consisting of forming gas, carbon monoxide, hydrogen, ammonia and mixtures of these gases.

5. The process according to claim 1, wherein a residence time in the first zone is between 0.8 and 1.5 seconds.

6. The process according to claim 1, wherein a sum of residence times in the second and third zone is between 15 seconds and 15 minutes.

* * * * *